US011305870B2

(12) United States Patent
Bellenger et al.

(10) Patent No.: US 11,305,870 B2
(45) Date of Patent: Apr. 19, 2022

(54) WHEEL ACTUATOR LOCKING MECHANISM

(71) Applicant: SAFRAN LANDING SYSTEMS, Velizy Villacoublay (FR)

(72) Inventors: Vincent Bellenger, Moissy-Cramayel (FR); Pierre-Yves Liegeois, Moissy-Cramayel (FR); Fabien Dijon, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 265 days.

(21) Appl. No.: 16/448,819

(22) Filed: Jun. 21, 2019

(65) Prior Publication Data
US 2019/0389567 A1 Dec. 26, 2019

(30) Foreign Application Priority Data

Jun. 26, 2018 (FR) ..................... 18 55741

(51) Int. Cl.
*B64C 25/40* (2006.01)
*B64C 25/36* (2006.01)

(52) U.S. Cl.
CPC ............ *B64C 25/405* (2013.01); *B64C 25/36* (2013.01)

(58) Field of Classification Search
CPC ............................ B64C 25/405; B64C 25/36
USPC ......................................................... 244/50
See application file for complete search history.

(56) References Cited

U.S. PATENT DOCUMENTS

| 2,381,842 | A | * | 8/1945 | Schwend | B64C 25/40 244/103 S |
| 3,762,670 | A | * | 10/1973 | Chillson | B64C 25/36 244/50 |
| 3,874,619 | A | * | 4/1975 | Collins | B64C 25/405 244/50 |
| 9,751,622 | B2 | * | 9/2017 | Blanc | B64C 25/405 |
| 10,486,800 | B2 | * | 11/2019 | Didey | B64C 25/405 |
| 2010/0012779 | A1 | * | 1/2010 | Collins | B64C 25/24 244/102 R |
| 2011/0233327 | A1 | * | 9/2011 | Mellor | B64C 25/20 244/102 A |

(Continued)

FOREIGN PATENT DOCUMENTS

| FR | 1 503 853 A | 12/1967 | |
| GB | 2524246 A | * 9/2015 | ............. F16B 21/04 |

(Continued)

OTHER PUBLICATIONS

French Preliminary Search Report for FR 18 55741 dated Jan. 29, 2019.

*Primary Examiner* — Christopher P Ellis
(74) *Attorney, Agent, or Firm* — Sughrue Mion, PLLC

(57) ABSTRACT

An aircraft undercarriage including a wheel, a support, a drive system, a mover system, a first pair of links, and a locking actuator. The drive system drives rotation of the wheel and is mounted to move relative to the support between an engaged position and a disengaged position. The mover system moves the drive system between the engaged and disengaged positions. The first pair of links are hinged to each other about a first hinge axis to pivot during the movement of the drive system between the engaged and disengaged positions. The locking actuator acts on a first target to lock or unlock the drive system. The first target is carried by one of the links.

12 Claims, 3 Drawing Sheets

(56) References Cited

U.S. PATENT DOCUMENTS

| | | | |
|---|---|---|---|
| 2012/0217340 A1 | 8/2012 | Essinger et al. | |
| 2013/0299633 A1* | 11/2013 | Tierney | B64C 25/24 244/102 SL |
| 2016/0039519 A1* | 2/2016 | Didey | F16H 1/06 244/103 S |
| 2016/0221668 A1* | 8/2016 | Didey | B64C 25/34 |
| 2016/0318604 A1* | 11/2016 | Guery | B64C 25/34 |
| 2017/0029096 A1* | 2/2017 | Di | F16D 3/185 |
| 2017/0101173 A1* | 4/2017 | Morris | F16H 1/24 |
| 2017/0106974 A1* | 4/2017 | Morris | B64C 25/405 |
| 2017/0197707 A1* | 7/2017 | Morris | F16H 1/24 |
| 2017/0267335 A1* | 9/2017 | Bellenger | F16D 28/00 |
| 2020/0148339 A1* | 5/2020 | Liegeois | F15B 15/26 |

FOREIGN PATENT DOCUMENTS

| | | | | |
|---|---|---|---|---|
| WO | 2011/073587 A1 | 6/2011 | | |
| WO | WO-2012071456 A2 * | 5/2012 | | B64C 25/405 |
| WO | 2015/040364 A1 | 3/2015 | | |

\* cited by examiner

WHEEL ACTUATOR LOCKING MECHANISM

The invention relates to the general field of aircraft landing gear fitted with a system for driving a landing gear wheel in rotation.

BACKGROUND OF THE INVENTION

By way of example, it is known from patent document FR 3 011 531 A1 for an aircraft undercarriage to comprise:

at least one wheel for enabling the aircraft to run on the ground;

a drive system for driving rotation of the wheel and movable between a position engaged with the wheel and a position disengaged from the wheel; and a mover system connected to the drive system in order to move it between its disengaged and engaged position.

The drive system can pass into the engaged position only when the aircraft is running on the ground at a speed that is lower than a maximum operating speed of the drive system.

In its engaged position, the drive system drives the wheel and enables the aircraft to be moved while minimizing use of other propulsion means that consume fuel.

If the running speed of the aircraft is above said maximum speed, it is then essential to prevent the drive system from going from its disengaged position to its engaged position.

If the drive system were to be in its engaged position while the aircraft is landing or running at a speed higher than said maximum speed, there would be a risk of the undercarriage or of the drive system braking.

That is why the drive system needs to be maintained in its disengaged position during stages of flight, of landing, and of takeoff, and it is essential to make this disengaged position safe in order to avoid any accidental passage into the engaged position.

OBJECT OF THE INVENTION

An object of the present invention is to provide an aircraft undercarriage that solves the above-mentioned problems, in full or in part.

SUMMARY OF THE INVENTION

To this end, the invention provides an aircraft undercarriage comprising:

at least one wheel;

a support;

a drive system for driving rotation of the wheel, the drive system being movable relative to said support between an engaged position relative to the wheel and a disengaged position relative to the wheel;

a mover system connected to the drive system in order to move it between its engaged and disengaged positions;

a first pair of links that are hinged to each other about a first hinge axis of this first pair of links, this first pair of links being arranged in such a manner that during the movement of the drive system between its engaged and disengaged positions, the links of this first pair of links pivot relative to each other about said first hinge axis of this first pair of links; and a locking actuator and at least one first target, the locking actuator being arranged to act at least on the first target in such a manner as to lock or unlock selectively the drive system in its disengaged position, the first target being carried by one of the links of the first pair of links.

The fact that the locking actuator acts at least on a first target carried by the first link in order to maintain the drive system in its disengaged position makes it possible to limit the locking force applied to the first target and thus limit the size of the locking actuator.

Since the first link is capable of pivoting about the first hinge axis of the first pair of links, during locking, torque is exerted on the first link in order to prevent it from pivoting. It is the lever arm effect that is a function of the distance between the first target and said first hinge axis that makes it simple to limit the forces applied on the locking actuator and on the first target during locking.

Thus, constraints on dimensioning the locking actuator and the first target can be limited in terms of shear strength, and/or traction strength, and/or hardness of the material constituting the locking actuator, and/or in terms of the weight of the locking actuator.

So long as it is not positioned in its engaged position, the drive system is always disengaged relative to the wheel.

In order to understand the present invention, in all of its embodiments, the various hinge axes, hinges, pivot axes, pivots are all arranged so as to enable movement in rotation about a common direction. In other words, the various hinge axes are mutually parallel.

BRIEF DESCRIPTION OF THE DRAWINGS

The invention can be better understood in the light of the following description of a particular embodiment of the invention, given with reference to the accompanying figures, in which.

DETAILED DESCRIPTION OF THE INVENTION

As mentioned above, the invention relates to an undercarriage 0 for aircraft. The undercarriage 0 is shown in part in FIGS. 2a, 2b, and 3a, 3b and it comprises a leg carrying a support 2, which support may be integrated with the leg (the leg and the support belonging to a single part) or it may be mechanically assembled to the leg. The leg extends along a longitudinal axis X0, referred to as the leg extension axis. For reasons of clarity, the leg is not shown and only its longitudinal axis X0 and the support 2 are shown diagrammatically.

The undercarriage 0 is connected to a carrier structure of the aircraft via its leg.

A terminal end of this leg carries at least one axle about which at least one wheel R is rotatably mounted to enable the aircraft to run on the ground.

For reasons of clarity, only portions of the wheel R are shown. The axis X0 preferably passes through the axis of rotation of the wheel R relative to the support 2.

Figure 2A:
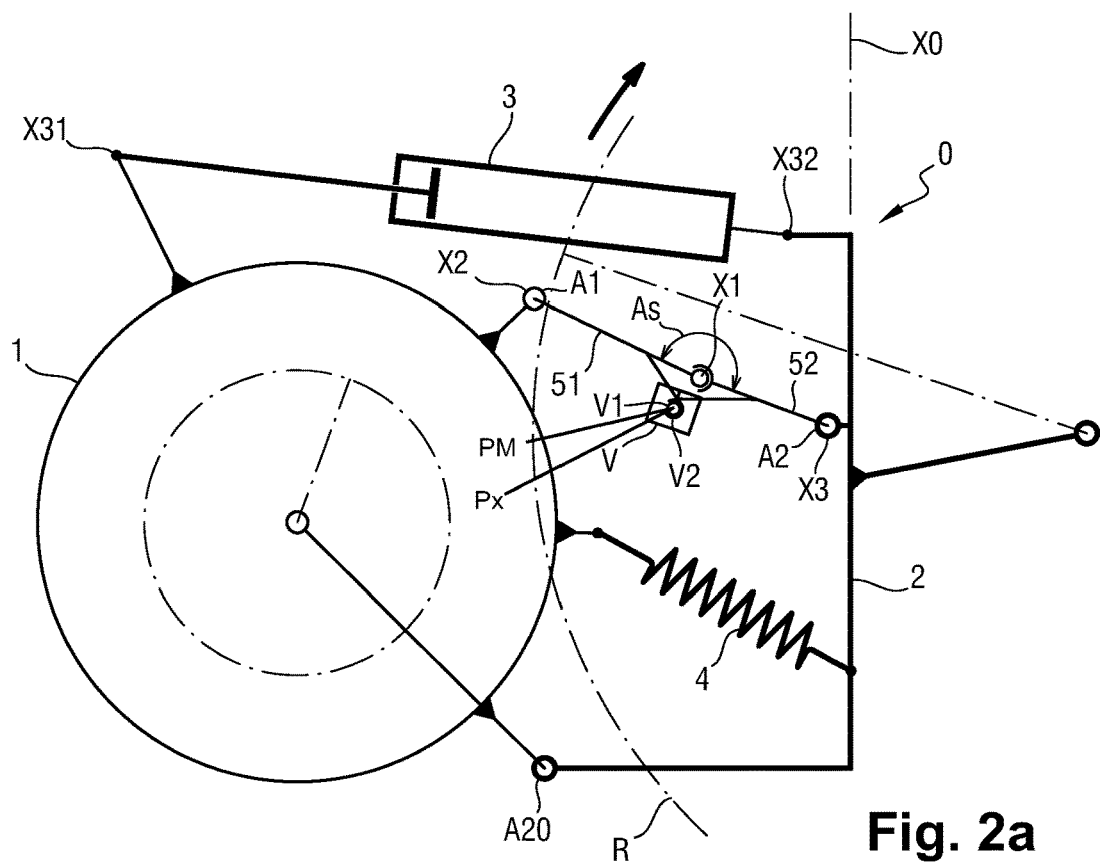
FIG. 2a shows a first embodiment of the undercarriage 0 of the invention while the drive system 1 is in its disengaged position, in this first embodiment, the undercarriage has a first pair of links 51 and 52 that are hinged to each other and that are hinged respectively to the wheel drive system 1 and to the support 2, and a locking actuator V acting on a target V1 carried by one of the links 51 in order to lock the drive system in the disengaged position.
Figure 2B:
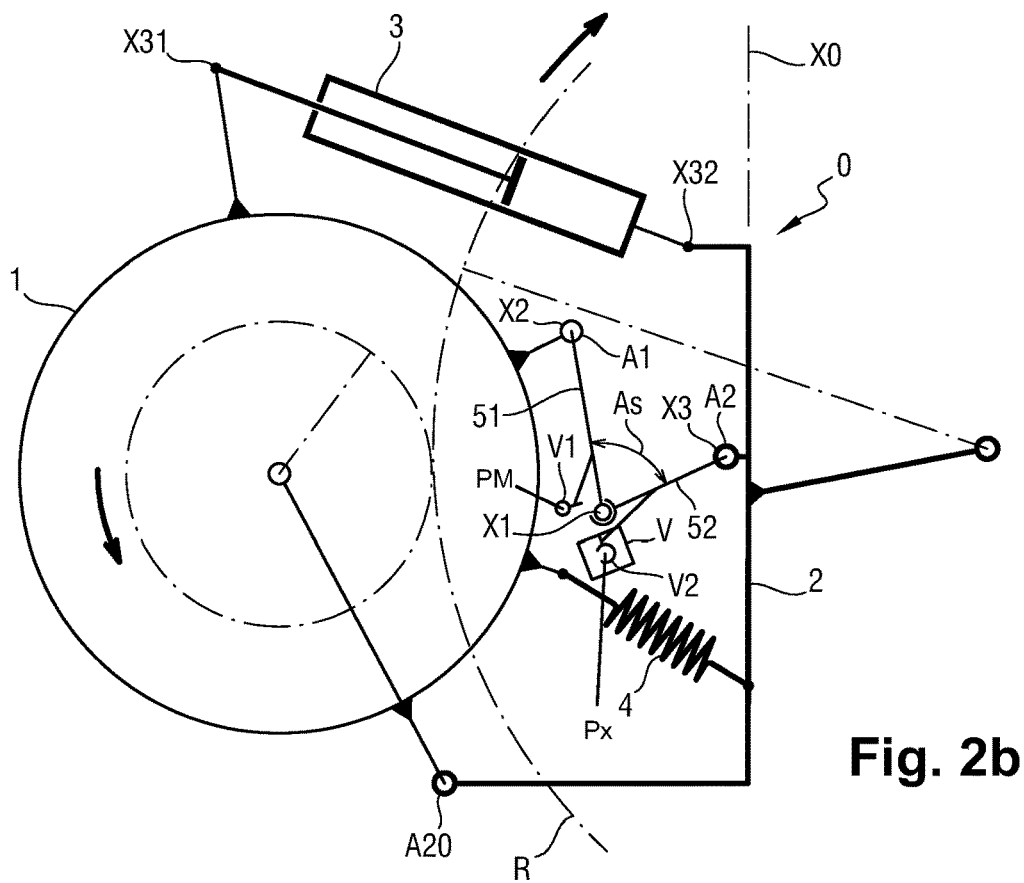
FIG. 2b shows the FIG. 2a undercarriage while the drive system is in its engaged position.
Figure 3A:
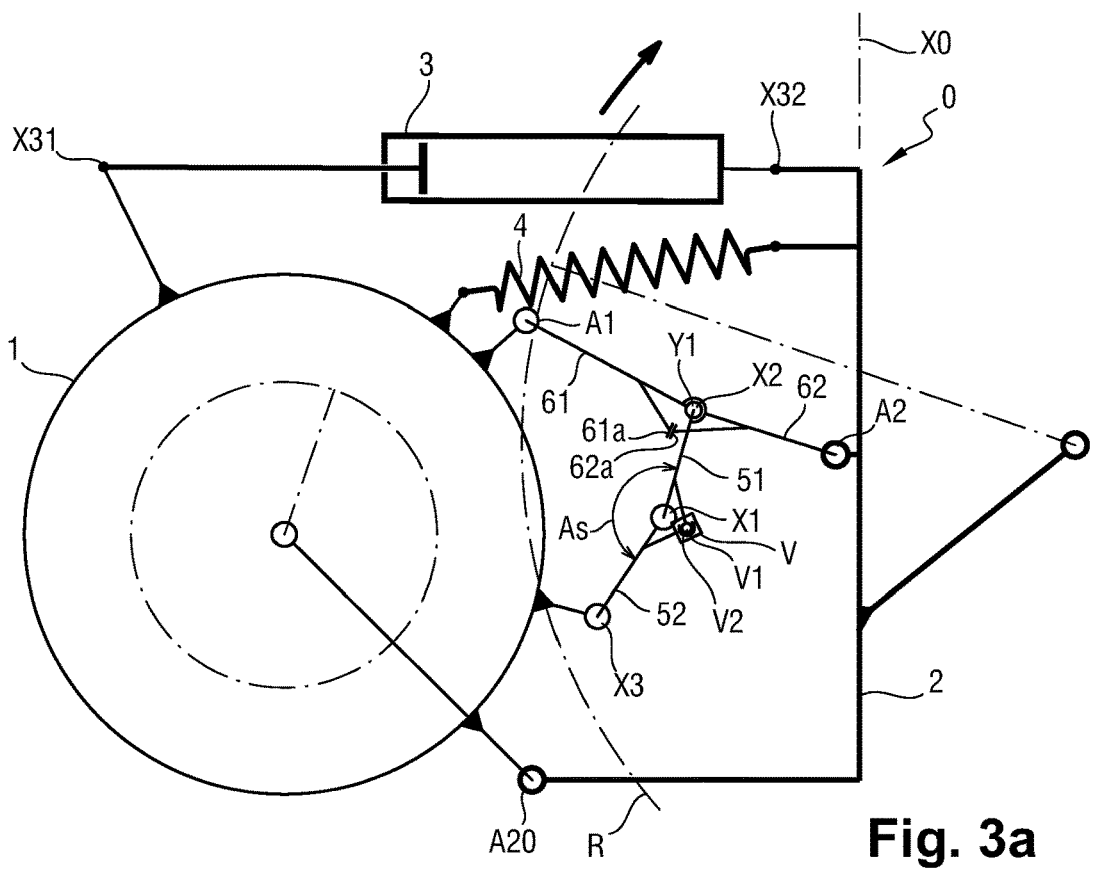
FIG. 3a shows a second embodiment of the undercarriage 0 of the invention while the drive system 1 is in its disengaged position, in this second embodiment, there is a first pair of links 51, 52 hinged to each other and a second pair of links 61, 62 hinged to each other in order to form a deformable linkage hinged on one side to the drive system and on the other side to the support 2, one of the links of the first pair of links 51 being hinged to at least one of the links 61, 62 of the second pair of links, this second embodiment serving to minimize the locking forces encountered by the locking actuator V and by the first target V1.
Figure 3B:
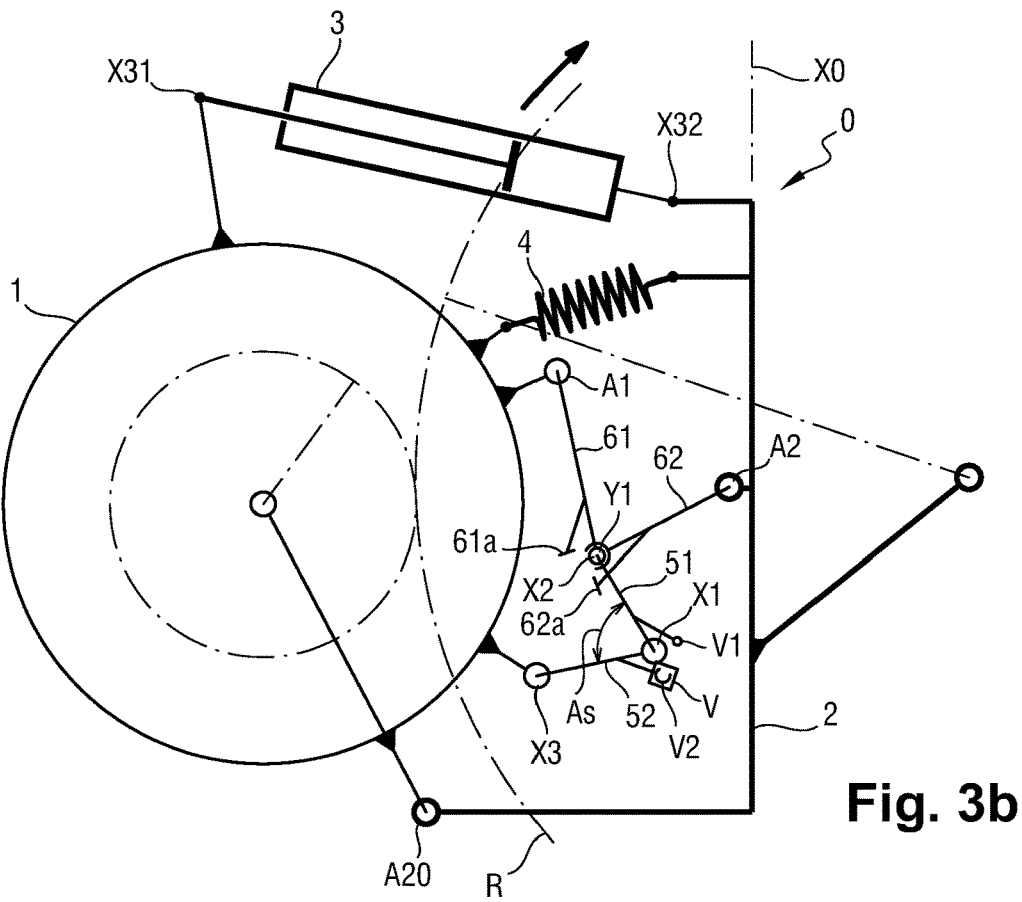
FIG. 3b shows the FIG. 3a undercarriage when the drive system 1 is in its engaged position.

The wheel R can be driven in rotation by a drive system 1 that may be a motor such as an electric motor suitable for transmitting driving torque to the wheel R when it is in its engaged position, as shown in FIGS. 2b and 3b. The drive system 1 is connected to the leg via a support 2. Preferably, the support 2 is assembled to be stationary relative to the axle in order to limit relative movements between the support and the axle. Naturally, the leg and the support could also constitute a single part.

The wheel R may be securely connected to a drive ring, and under such circumstances, the drive system 1 in the engaged position is engaged against this ring, e.g. by meshing teeth.

Alternatively, the drive system 1 may have a roller that rubs directly against the wheel in order to drive it in rotation.

The drive system 1 is movable between an engaged position, as shown in FIGS. 2b and 3b, and a disengaged position, as shown in FIGS. 2a and 3a.

For this purpose, the drive system 1 is mounted to move in pivoting relative to said support 2 via a main hinge axis A20.

The undercarriage also has a mover system 3 connected to the drive system 1 in order to move it between its engaged and disengaged positions.

Ideally, the mover system 3 is not adapted to move the drive system beyond its disengaged position, and it is adapted solely to move it from its disengaged position to its engaged position, and vice versa.

The connection between the mover system 3 and the drive system 1 takes place via a first hinge X31 of the mover system 3.

The connection between this mover system 3 and the support 2 takes place via a second hinge X32 of the mover system 3.

The mover system 3 comprises a telescopic actuator of hydraulic or possibly electrical type.

Resilient return means 4 are arranged to exert a resilient return force urging the drive system 1 away from its engaged position towards its disengaged position. In other words, the resilient return means 4 are arranged to act resiliently to oppose the drive system passing from its disengaged position towards its engaged position and to urge it towards its disengaged position.

In this example, the resilient means 4 comprise a compressible helical spring, however they could be implemented with one or more flexible spring blades or with a torsion spring or with a gas compression actuator.

The resilient means 4 are preferably hinged on one side to the drive system and on the other to the support.

In each of the embodiments, the undercarriage of the invention has at least a first pair of links 51, 52 that are hinged to each other about a first hinge axis X1 of this first pair of links 51, 52.

This axis X1 is common to both links 51 and 52 so as to hinge them together.

This first pair of links 51 and 52 is arranged in such a manner that when the drive system moves between its engaged and disengaged positions, the links 51 and 52 of this first pair of links pivot relative to each other about said first hinge axis X1.

The undercarriage also has a locking actuator V and at least a first target V1.

The locking actuator V is arranged to act selectively at least on the first target V1 so as to lock or unlock the drive system 1 in its disengaged position. The locking actuator V is arranged selectively to adopt a locking position or an unlocking position.

Preferably, the locking actuator V is provided with internal resilient return means and/or an internal spring so that in the absence of any power to the locking actuator V, it automatically adopts its locking position and is maintained in this locking position.

The locking actuator V is also arranged to go from its locking position to its unlocking position when it receives unlocking energy, e.g. in the form of an unlocking command generated by a control unit connected to the locking actuator V.

Energy is therefore required to cause the actuator V to move into the unlocking position, whereas no energy is required for it to occupy its locking position and to remain therein.

The first target V1 is carried by one of the links 52 of this first pair of links 51, 52.

Acting on a target V1 carried by a link 51 so as to oppose the drive system 1 passing from its disengaged position to its engaged position, enables a lever effect provided by this pivoting link to be used to minimize the forces that need to be applied to the target and to the locking actuator.

Constraints on dimensioning the target V1 and the locking actuator V can be minimized. The costs of providing the locking function can also be minimized at the same time as improving the safety of the locking function.

The locking actuator V may be an actuator that moves a bolt Px in translation along a translation axis parallel to the axis X1.

The hinges and pivots of the present invention all allow the parts that are hinged together in this way to pivot about pivot axes and/or hinge axes that are parallel to a common direction.

Each given link 51, 52 of the first pair of links extends longitudinally along a given straight line segment specific to that given link and intersecting both the first hinge axis X1 and also another hinge axis that is specific to that given link.

Thus, the first link 51 extends along a straight line segment intersecting the two hinge axes X1 and X2.

In similar manner, the second link 52 extends along another straight line segment passing through the two hinge axes X1 and X3.

Between the given straight line segments specific to each of these links, the links 51 and 52 of this first pair of links form a salient angle As in a plane perpendicular to the first hinge axis X1. By definition, a salient angle is an angle greater than 0° and less than 180°.

This salient angle As is greater than a first angle value of 110°, preferably greater than 160° of angle, preferably greater than 165° of angle when the drive system 1 is in its disengaged position, and this salient angle As takes a second angle value when the drive system 1 is in its engaged position.

This second angle value for As is strictly less than said first angle value.

Thus, when the drive system 1 passes from its disengaged position to its engaged position, the salient angle As formed between the two links 51 and 52 decreases progressively and passes from a first value that is greater than 110° in the disengaged position to a second value that is less than 110° in the engaged position (the second value is preferably 60° smaller than the first value).

The locking torque exerted by the locking actuator V on said at least one first target V1 depends on the angle formed between the links 51 and 52.

More precisely, the mechanical locking torque needed to oppose these links 51 and 52 approaching each other by pivoting about the axis X1 decreases as the salient angle As formed between these links increases.

Selecting a first value for the salient angle As that is greater than 110° greatly minimizes the locking torque needed for maintaining the disengaged position.

In this sense, the locking actuator V can be smaller, thereby achieving a saving in weight and a non-negligible reduction in the space it occupies.

Preferably, the undercarriage has a second target V2 carried by the other link 52 of this first pair of links. The locking actuator V is arranged to act simultaneously on the first and second targets V1 and V2 in order to lock the drive system 1 in its disengaged position. This coupling improves the locking effect.

In order to perform this selective locking, the locking actuator V has a bolt Px and said first target V1 forms a first striker PM for receiving the bolt Px when the locking actuator V is in a locking configuration and the drive system 1 is in its disengaged position.

In similar manner, in the embodiment in which the undercarriage has a second target V2, the second target V2 forms a second striker designed to receive said bolt of the locking actuator V when the locking actuator is in a locking configuration and the drive system 1 is in its disengaged position.

Typically, the first target V1 may be a hole formed in the first link 51 of the first pair of links 51, 52, and the second target V2 may be a hole formed in the second link 52 of the first pair of links 51, 52. These holes V1 and V2 formed in these links 51 and 52 are in alignment with each other when the drive system is in its disengaged position so that the bolt of the locking actuator V can extend in both of these holes and prevent the links 51 and 52 from moving relative to each other.

Thus, the locking actuator is arranged to act simultaneously on the first target V1 and on the second target V2 so as to provide said selective locking or unlocking of the disengaged position.

The undercarriage of the invention also has a control unit connected to said mover system 3 in order to control the mover system 3 for the purpose of selectively moving the drive system towards its disengaged position or towards its engaged position.

The control unit is also connected to said locking actuator V to cause it to move from a locking position to an unlocking position. In the locking position, the actuator V locks the drive system 1 in its disengaged position, and in the unlocking position, it unlocks the drive system 1 so as to allow it to move away from its disengaged position.

In the embodiment of FIGS. 2a and 2b, one of the links, 51, of the first pair of links is hinged relative to the drive system 1, while the other link 52 of the first pair of links is hinged relative to the support 2.

The first link 51 is hinged relative to the drive system 1 via a first secondary hinge axis A1, and the second link 52 is hinged relative to the support 2 via a second secondary hinge axis A2.

This embodiment presents the advantage of having only one pair of links 51, 52 for connecting the drive system 1 to the support 2, and locking is thus performed directly on this single pair of links 51, 52.

The drawback of this solution is that the locking force exerted on the locking actuator remains large since this first pair of links takes up only a limited amount of the forces needed to move the drive system 1 towards its engaged position.

In order to limit this drawback, the preferred embodiment is proposed as described below with reference to FIGS. 3a and 3b.

In this embodiment, the undercarriage 0 has a second pair of links 61 and 62 that are hinged to each other about a first hinge axis Y1 of the second pair of links 61, 62.

This second pair of links 61, 62 is arranged so that during the movement of the drive system 1 between its engaged and disengaged positions, the links 61, 62 of this second pair of links pivot relative to each other about said first hinge axis Y1.

At least one of the links 61 and 62, and specifically both of the links 61 and 62, is/are connected to a respective one of the links 51, 52 of the first pair of links via respective pivot connections. These pivot connections are such that pivoting the links 61 and 62 of the second pair of links relative to each other drives pivoting of the links 51 and 52 of the first pair of links relative to each other.

In this way, because of the pivot connection between one of the links 51 of the first pair of links and at least one of the links of the second pair of links 61, 62, the forces needed for moving the drive system 1 towards its engaged position are firstly taken up and minimized via the second pair of links 61, 62 and then via the first pair of links 51, 52.

This enables effective locking to be achieved while applying smaller locking forces to the first target carried by the first link 51 of the first pair of links.

The requirements for dimensioning the locking actuator V are minimized to a much greater extent.

Preferably, said pivot connection connecting at least one of the links 61, 62 of the second pair of links to one of the links 51, 52 of the first pair of links is a pivot connection about said first hinge axis Y1 of the second pair of links 61, 62.

In other words, this pivot connection connecting at least one of the links of the second pair of links 61, 62 to one of the links of the first pair of links takes place about a pivot axis that coincides with the first hinge axis Y1.

Mechanically speaking, the first hinge axis Y1 may be constituted by an axisymmetric part serving both as a hinge axis for hinging the links 61 and 62 relative to each other and also as a hinge axis for hinging one of the links 51 of the first pair of links relative to the links of the second pair of links.

Preferably, and as shown in FIGS. 3a and 3b, one of the links 61 of the second pair of links 61, 62 is hinged relative to the drive system 1, while the other link 62 of the second pair of links is hinged relative to the support 2.

More precisely, a first link 61 of the second pair of links 61, 62 is hinged relative to the drive system 1 via a first secondary hinge axis A1, and the second link 62 of the second pair of links 61, 62 is hinged relative to the support 2 via a second secondary hinge axis A2.

Preferably, one of the links 61 of the second pair of links 61, 62 carries a first abutment 61*a* and the other link 62 of the second pair of links carries a second abutment 62*a*.

These first and second abutments 61*a* and 62*a* are arranged to come into contact against each other when the drive system 1 is in its disengaged position so as to oppose movement of the drive system from its disengaged position away from its engaged position. These first and second abutments 61*a* and 62*a* are spaced apart from each other so long as the drive system 1 is positioned away from its disengaged position and lies between its disengaged position and its engaged position.

These abutments 61*a* and 62*a* serve to take up forces tending to move the drive system 1 beyond its disengaged position away from its engaged position.

Thus, in the embodiment of FIGS. 3*a* and 3*b*, where there are both the first and the second pairs of links, the abutments 61*a* and 62*a* are carried by the second pair of links 61, 62, while the first and second targets V1 and V2 are carried by the first pair of links 51, 52.

In the embodiment of FIGS. 2*a* and 2*b*, the first link 51 of the first pair of links carries a first abutment, e.g. formed level with the first target V1, and the second link 52 may also have a second abutment, e.g. formed level with the second target V2.

In both of these embodiments of FIGS. 2*a* & 2*b* and 3*a* & 3*b*, these first and second abutments always serve to oppose the drive system 1 going beyond its disengaged position, and they therefore define this disengaged position.

Naturally, an abutment could be provided that is carried by the support 2 in order to oppose movement of the drive system beyond its disengaged position by coming into abutment against the drive system.

In the event of the mover system 3 failing, since the resilient return means 4 exert a force tending to hold the drive system in the disengaged position with the first and second abutments in contact with each other, the drive system 1 is moved away from its engaged position towards its disengaged position and the resilient return means 4 oppose any departure of the drive system from this safe position.

The drive system 1 is then made safe in its disengaged position by the resilient return means 4.

In the event of the mover system 3 failing to operate, e.g. as a result of mechanical breakage of the mover system, the resilient return means 4 encourages the drive system 1 to pass into its disengaged position. Any risk of accidental engagement with the wheel is thus reduced.

Preferably, the mover system 3, which is in this example comprises a hydraulic actuator, is dimensioned so that the maximum force that it is capable of generating for causing the drive system to pass from its disengaged position to its engaged position can be withstood by the locking actuator V and the first target V1 so as to maintain locking and consequently maintain the drive system in its disengaged position.

For this purpose, the mover system 3 may present a hydraulic system of active section that is such that even in the event of the mover system being fed with its predetermined service pressure, passing into the engaged position remains impossible so long as the locking system is locked.

Thus, by means of the invention, two conditions need to be satisfied simultaneously in order to enable the drive system 1 to pass from its disengaged position to its engaged position.

It is necessary firstly for the mover system 3 to be controlled to move the drive system 1 towards its engaged position, and it is also necessary for the locking actuator V to be controlled so as to be unlocked.

This provides two-part security for the disengaged position.

In the event of a simple failure of the mover system 3, e.g. a failure to feed operating energy to the actuator, the resilient return means 4 then forces the drive system to move towards its disengaged position, which is reached when the abutments 61*a* and 62*a* come into contact against each other.

Ideally, the respective positions of the target(s), and/or of the abutment(s), and/or of the locking actuator are adjustable so as to enable the engaged and disengaged positions to be adjusted.

The invention also makes it possible to segregate the following functions:

resilient return of the drive system (via the resilient return means);

moving the drive system (via the mover system and so long as the actuator can be operated between its extreme configurations); and maintaining the drive system in a safe position by the first and second abutments carried by the links of the first pair of links coming into contact.

Figure 1:
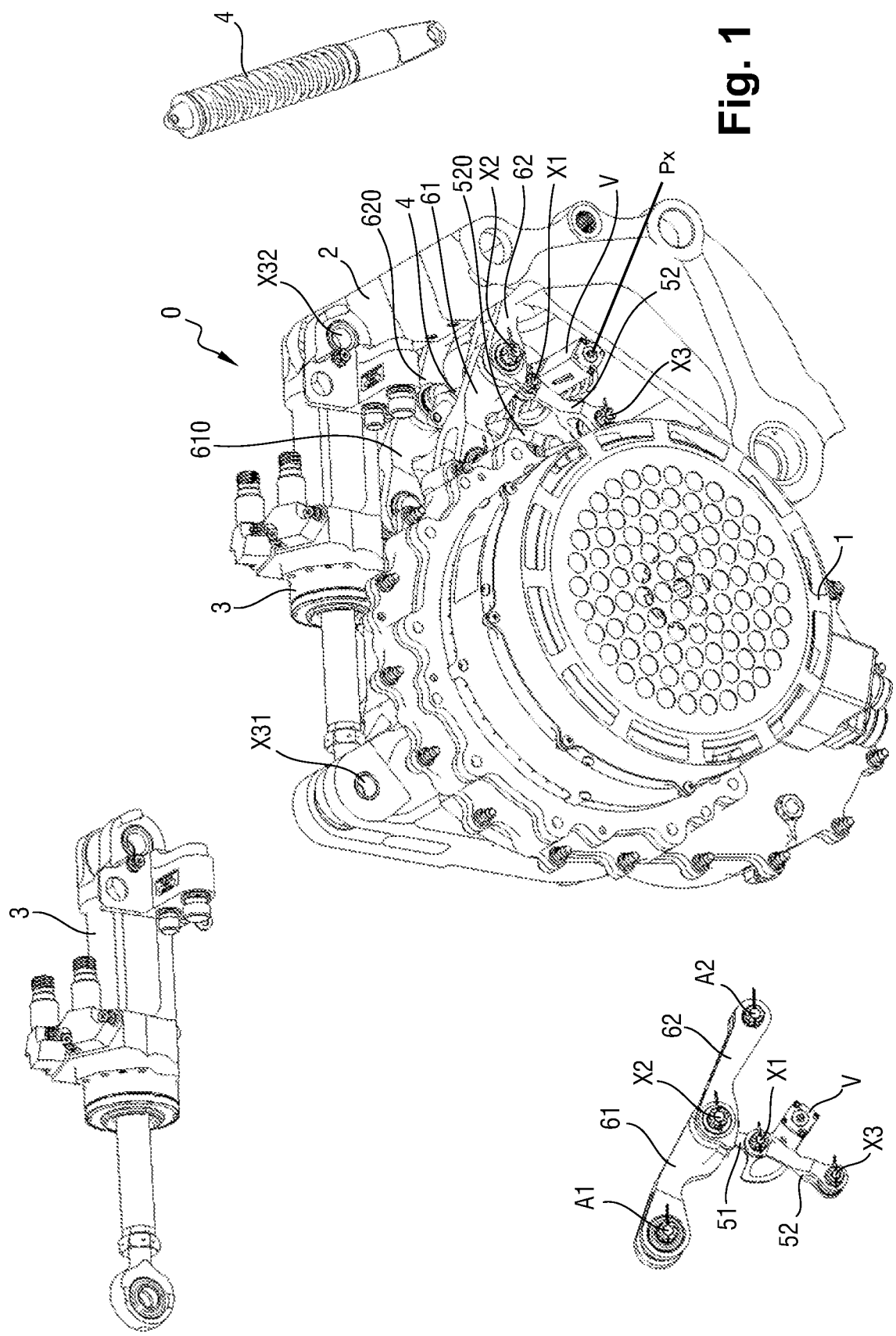
FIG. 1 shows firstly a portion of the undercarriage of the invention while the drive system is in the disengaged position, and secondly a plurality of components of the undercarriage shown individually.

It should be observed that in order to reduce the forces applied on the locking actuator V and the targets V1 and V2, and as in the example of FIG. 1, it is possible to arrange for two first pairs of links 51, 52, 520 that are distinct from each other and for two locking actuators V. These two first pairs of links are mutually identical and they are arranged so that their first hinge axes X1 all lie on the same axis.

Each of these two first pairs of links carries a first target and the locking forces are thus shared between the two locking actuators V and the two first targets.

In this embodiment, as in the embodiment shown in FIGS. 3*a* and 3*b*, there are also two second pairs of mutually identical links 61, 62, and 610.

These two second pairs of links 61, 62, and 610 are arranged so that their first hinge axes X2 are all on the same axis.

Naturally, the number of locking actuators V, of targets V1, V2 carried by the links, or of pairs of hinged links could vary while remaining within the spirit of the present invention.

Finally, it should be observed that although the locking actuator V is carried by one of the links of the first pair of hinge links, it could also be fastened on the support 2.

The invention claimed is:

1. An aircraft undercarriage comprising:
   at least one wheel;
   a support;
   a drive system for driving rotation of the wheel, the drive system being movable relative to said support between an engaged position relative to the at least one wheel and a disengaged position relative to the wheel;
   a mover system connected to the drive system in order to move the drive system between the engaged and disengaged positions;
   a first pair of links that are hinged to each other about a first hinge axis of this first pair of links, the first pair of links being arranged in such a manner that during the movement of the drive system between the engaged and disengaged positions, the first pair of links pivot relative to each other about said first hinge axis of the first pair of links; and
   a locking actuator and at least one first target, the locking actuator being arranged to act on at least the at least one first target in such a manner as to selectively lock the drive system in the disengaged position, the at least one first target being carried by one of the links of the first pair of links.

2. An aircraft undercarriage according to claim 1, wherein each given link of the first pair of links extends longitudinally along a given straight line segment specific to the given link and intersecting the first hinge axis and another hinge axis specific to that given link, the links of the first pair of links forming, between the given straight lines specific to the links, a salient angle in a plane perpendicular to the first hinge axis, the salient angle being greater than a first angle value of 110° when the drive system is in the disengaged position and the salient angle taking a second angle value when the drive system is in the engaged position, the second angle value being less than said first angle value.

3. An aircraft undercarriage according to claim 1, further comprising a second target carried by the other one of the links of the first pair of links, the locking actuator being arranged to act simultaneously on the at least one first target and on the second target in order to lock the drive system in the disengaged position.

4. An aircraft undercarriage according to claim 1, having a second pair of links that are hinged to each other about a first hinge axis of the second pair of links, the second pair of links being arranged so that during the movement of the drive system between the engaged and disengaged positions, the links of the second pair of links pivot relative to each other about said first hinge axis of the second pair of links, at least one of the links of the second pair of links being connected to at least one of the links of the first pair of links via a pivot connection so that pivoting of the links of the second pair of links relative to each other drives pivoting of the links of the first pair of links relative to each other.

5. An aircraft undercarriage according to claim 4, wherein said pivot connection connecting at least one of the links of the second pair of links to one of the links of the first pair of links is a pivot connection about said first hinge axis of the second pair of links.

6. An aircraft undercarriage according to claim 4, wherein one of the links of the second pair of links is hinged relative to the drive system, while the other one of the links of the second pair of links is hinged relative to the support.

7. An undercarriage according to claim 4, wherein one of the links of the second pair of links carries a first abutment and the other one of the links of the second pair of links carries a second abutment, the first and second abutments coming into contact with each other when the drive system is in the disengaged position so as to oppose movement of the drive system beyond the disengaged position away from the engaged position, and the first and second abutments being spaced apart from each other so long as the drive system is positioned away from the disengaged position and lies between the disengaged position and the engaged position.

8. An aircraft undercarriage according to claim 1, wherein one of the links of the first pair of links is hinged relative to the drive system, while the other link of the first pair of links is hinged relative to the support.

9. An undercarriage according to claim 1, wherein the locking actuator includes a bolt, and said at least one first target forms a first striker provided to receive the bolt when the locking actuator is in a locking configuration and the drive system is in the disengaged position.

10. An undercarriage according to claim 1, including a control unit connected to said mover system in order to control the mover system so as to cause the drive system to move selectively towards the disengaged position or the engaged position, the control unit also being connected to said locking actuator to control the locking actuator to move from a locking position to an unlocking position, the locking actuator placed in the locking position being adapted to lock the drive system in the disengaged position, and the locking actuator placed in the unlocking position being adapted to unlock the drive system to allow the drive system to move away from the disengaged position.

11. An undercarriage according to claim 1, including resilient return means arranged to oppose resiliently the drive system passing from the disengaged position towards the engaged position so as to urge the drive system into the disengaged position.

12. An undercarriage according to claim 1, wherein the drive system for driving rotation of the wheel is pivotally mounted to move relative to said support about a main hinge axis.

\* \* \* \* \*